US009767637B2

(12) United States Patent
Anderson

(10) Patent No.: US 9,767,637 B2
(45) Date of Patent: Sep. 19, 2017

(54) METHOD AND SYSTEM FOR CHANGING ILLUMINATION OF GAMING MACHINE DISPLAY TO COMPLEMENT GAME OUTCOME

(75) Inventor: Philip Jeffrey Anderson, Las Vegas, NV (US)

(73) Assignee: ARISTOCRAT TECHNOLOGIES, INC., Las Vegas, NV (US)

( * ) Notice: Subject to any disclaimer, the term of this patent is extended or adjusted under 35 U.S.C. 154(b) by 0 days.

(21) Appl. No.: 13/434,649

(22) Filed: Mar. 29, 2012

(65) Prior Publication Data

US 2012/0184348 A1 Jul. 19, 2012

Related U.S. Application Data

(63) Continuation of application No. 11/938,112, filed on Nov. 9, 2007, now abandoned.

(60) Provisional application No. 60/857,841, filed on Nov. 10, 2006.

(51) Int. Cl.
*A63F 13/00* (2014.01)
*G07F 17/32* (2006.01)

(52) U.S. Cl.
CPC ................................ *G07F 17/3211* (2013.01)

(58) Field of Classification Search
CPC ........................... G07F 17/3288; G07F 17/326
USPC ............................................. 463/16, 30, 31
See application file for complete search history.

(56) References Cited

U.S. PATENT DOCUMENTS 5,766,074 A * 6/1998 Cannon et al. ................. 463/16
6,027,115 A 2/2000 Griswold et al.
6,319,124 B1 * 11/2001 Baerlocher et al. ............ 463/20
2001/0048193 A1 * 12/2001 Yoseloff et al. ........... 273/138.1
2002/0173354 A1 * 11/2002 Winans et al. .................. 463/20
2003/0109304 A1 * 6/2003 Gauselmann ....... G07F 17/3211 463/30
2005/0288090 A1 * 12/2005 Thomas .................. G07F 17/34 463/20
2006/0068875 A1 * 3/2006 Cregan ............... G07F 17/3211 463/16
2007/0293292 A1 * 12/2007 Gipp ................... G07F 17/3211 463/16
2008/0039213 A1 * 2/2008 Cornell ................... G07F 17/32 463/46
2008/0102924 A1 * 5/2008 Okada ............................ 463/20

* cited by examiner

*Primary Examiner* — James S McClellan
*Assistant Examiner* — Kevin Carter
(74) *Attorney, Agent, or Firm* — Armstrong Teasdale LLP

(57) ABSTRACT

A gaming device repetitively generating an outcome display, for each play, is positioned relative to a companion complementary display. The symbols dominant to a winning outcome, which are displayed after a play, are used to control the characteristic of the complementary display. Several symbols may be displayed to indicate a game outcome in association with color characteristics. In an embodiment, a color of light is associated with a particular game symbol.

22 Claims, 4 Drawing Sheets

75

77

| SYMBOL | DESIGNATED COLOR(S) | LIGHT CHARACTERISTIC |
|---|---|---|
| Q | GOLD | GOLD LIGHT |
| K | ORANGE | ORANGE LIGHT |
| 2Q | GOLD | GOLD FLASHING |
| 2K | ORANGE | ORANGE FLASHING |
| QK | GOLD AND ORANGE | GOLD FLASH ORANGE FLASH |

METHOD AND SYSTEM FOR CHANGING ILLUMINATION OF GAMING MACHINE DISPLAY TO COMPLEMENT GAME OUTCOME

CROSS-REFERENCE TO RELATED APPLICATION

The present application claims priority to U.S. Provisional Patent Application No. 60/857,841 filed on Nov. 10, 2006, entitled "METHOD AND SYSTEM FOR CHANGING ILLUMINATION OF GAMING MACHINE DISPLAY TO COMPLEMENT GAME OUTCOME," which is herein incorporated by reference in its entirety.

FIELD OF THE INVENTION

The present invention relates to a gaming machine, and more particularly to a method and apparatus for generating a display in association with the particular outcome of a gaming machine during its operation.

BACKGROUND OF THE INVENTION

Slot machines are popular gaming devices found in casinos throughout the world. The entertainment value of such machines is related in part to the perceived likelihood of winning money. It would be highly desirable to vary or accelerate this anticipation factor to increase the value of the slot machine. Besides a perceived likelihood of winning, a number of factors, including visual affects created by the gaming machine, serve to increase the excitement level of the player. There is a need for new gaming machines in the gaming industry which will enhance the entertainment value and excitement level of slot machines.

Players who regularly play gaming machines can quickly lose interest in the particular games used. Manufacturers of such gaming machines therefore seek to develop innovative game features that add interest to the games provided on such machines, or to provide new games in order to keep players amused and willing to continue playing gaming machines.

Certain disadvantages have been present in many prior slot machines. For example, limitations of prior gaming machines include an inability to captivate gamblers, poor lighting, lack of interchangeability or reconfiguration among components, and/or issues with reel movement.

Therefore, it would be desirable to provide an improved method and apparatus for stimulating a player's frequent play on a gaming machine, such as a slot machine.

It would be highly desirable to provide an improved method and apparatus for increasing the entertainment value of gaming machines.

It would also be desirable to increase the win anticipation level of the player while playing a gaming machine.

It would also be desirable to highlight at least certain winning outcomes on the gaming machine to increase the entertainment value of the game.

SUMMARY OF THE INVENTION

Certain embodiments provide systems, methods and apparatuses for generating a display in association with a particular outcome of a gaming machine during its operation. Certain embodiments provide systems, method and apparatuses for displaying several symbols to indicate game outcome, in association with light characteristics.

Certain embodiments provide a gaming device for use by a player. The gaming device includes a symbol display operable for displaying to the player at a given time a plurality of symbols. The plurality of symbols represents a game outcome and are displayed at the symbol display in a game display area in the display. Typically the symbols are displayed in a matrix of symbols. The game symbols have several characteristics such a shape, color(s) or graphic design. The gaming device also includes a complementary display area positioned in the view of the player during play and generating a complementary display having at least a color characteristic. The complementary display area may be on the same display as the game display and defined in an area on one or more sides of the display area or may be defined by a separate display device. The gaming device further includes a controller for controlling at least the color generated by the complementary display area. The controller controls the display characteristic of the complementary display to complement one or more symbols displayed in the content display.

In an embodiment, the complementary display displays a color to complement the color(s) characteristic of a particular game symbol or symbol combination.

Certain embodiments provide a method for providing a game display to a player. The method includes displaying several ones of a plurality of symbols to a player. The method also includes designating display characteristics including color for association with at least one of the plurality of game symbols or game displays. The method further includes generating the complementary display to the player at a time during which the one of the plurality of symbols is displayed.

Certain embodiments provide a method of displaying game graphics to a player. The method includes providing a game display area for display of game content. The method also includes predefining a plurality of symbols. Additionally, the method includes displaying several ones, but not all, of a plurality of the symbols, in the game display area. The method further includes providing a complementary display area separate from the game display area. In addition, the method includes displaying color(s) and/or graphics in the complementary display area when a particular one of the symbols is displayed in the game display area.

Certain embodiments provide a slot machine including a game display area comprising at least one rotatable electromechanical reels including a plurality of game symbols. The plurality of symbols represents a game outcome. The slot machine also includes a complementary display arranged with respect to the game display area, e.g. adjacent to, around, over. The complementary display generates color(s) and/or graphics characteristics associated with a player's view of the game display area. The slot machine further includes a controller adapted to control the at least one complementary display. The controller controls the complementary display in accordance with game play in the game display area. The controller activates the complementary display to highlight or complement one or more desired symbols on the at least one rotatable reel.

Figure 1:
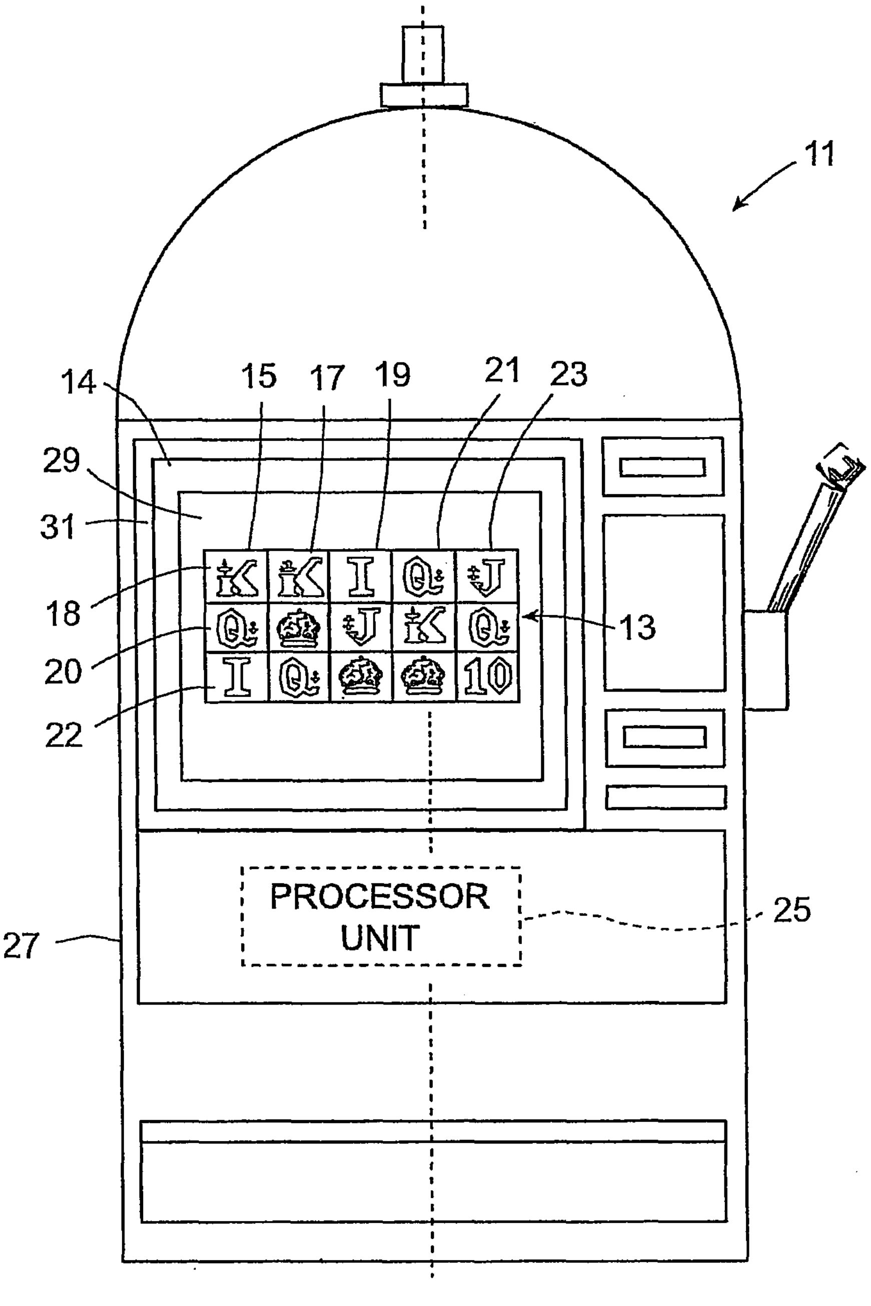
FIG. 1 is a front view of a gaming machine according to the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF CERTAIN EMBODIMENTS

Referring to FIG. 1, a gaming device 11 is in the form of a video slot machine having a game display, generally indicated at 13, for presenting game content to the player. Display 13 may be formed from a video display device 14, as for example, a liquid crystal display (LCD), a cathode ray tube display (CRT), a plasma display, or other type of video display, and is controlled to display five (5) simulated spinning reels 15, 17, 19, 21 and 23. When the reels stop game symbols are displayed in the game display 13 in matrix-form.

It will be understood that instead of providing a video display unit which displays representations of reels, actual, electro-mechanical reels may be used. Such gaming machines including actual rotatable reels are commonly termed stepper machines. For example, in an alternative embodiment, the gaming device 11 may be implemented as an electromechanical reel-based slot machine having a content display area 13 with spinning stepper reels 15, 17, 19, 21, and 23 rotating in the game display area 13. The game may have fewer or more reels as desired. The game display area 13 may be surrounded by a video display device 14, for example. Where a transmissive display is used the transmissive display may overlay the game display area 13. Video displays (e.g., LCD, CRT, plasma, etc.) and/or other illuminating or light sources (e.g., lamps, light emitting diodes (LEDs), etc.) may also be integrated with spinning reels 15, 17, 19, 21, and 23 to illuminate or animate desired display locations such as pay lines, pay combinations, winning lines, winning combinations, special symbols, etc.

Lighting may also be used to backlight symbols and/or generating a flickering or flashing effect as the electro-mechanical reels 15, 17, 19, 21, and 23 spin, for example. In certain embodiments, one or more light sources may be used with one or more filters to adjust certain characteristics of light emitted by the one or more light sources (e.g., altering lamp light to simulate natural daylight), for example.

To operate gaming device 11, the player enters a wager (money wager, wager of accumulated credits, etc.) and prompts device 11 to generate and display an outcome at the content display 13. If the outcome is a winning outcome, the player is awarded credits, coins, tokens, vouchers, etc. If the outcome is a losing outcome the player receives no award.

The outcome may be determined, for example, by the combination of symbols which appear in game display 13. Each of the five spinning reels carries a plurality of symbols, and when stopped presents one or more symbols in the game display 13. The symbols displayed may be associated with pay lines 18, 20, 22 or may represent "scatter" wins (a predetermined number of symbols displayed anywhere in the game display 13). Five symbols may appear along each horizontal "line" or row 18, 20, 22 of content display 13: For example, the middle line 20 may be the line upon which the outcome is determined. As shown in FIG. 1, middle line 20 has the combination of five symbols "Q", a "crown", "J", "K" and "Q". The top line 18 and the bottom line 22, may also have symbols and form two other pay line combinations of five symbols, which may be used to determine wins. Thus, an array of 3 by 5 symbols appears as the content display. More than three pay lines may be available for the player to wager upon.

Each of the symbols on the five reels is predefined prior to game play. There may be more than twenty different symbols that are carried by each of the five reels, and yet only three symbols of each reel are displayed.

Device 11 operates under control of a game control processor unit 25 disposed within a housing 27 of device 11. Game control processor unit 25 accounts for the wager input, randomly selects the outcome of the game and controls the five reels (the display 14) so as to display the selected outcome in content display 13 at a time after play was initiated. This time may be predetermined.

Gaming device 11 includes a complementary display area 29 shown in the illustrative embodiment as surrounding the game display area 13. Complementary display area 29 may be formed as a border of a portion of the video display device 14 (as shown in FIG. 1), e.g., on the same display as the game display area, or display area 29 may be a separate flat screen (not shown) which surrounds all or a portion display device 14. Complementary display area 29 is controlled to display an image having characteristics including color to complement and enhance the visual aspects of the game and one or more particular outcomes. Complementary display area 29 may be controlled to generate light, and more particularly, a particular color of light, a particular brightness of light, a particular flashing pattern of light, etc.

In addition to, or instead of, complementary display 29, an illuminated panel 31 may be provided to generate a light characteristic. Panel 31 surrounds the video display device 14. Panel 31 is adapted to be illuminated to one or more light characteristics, generated singly (green light, for example) or in combination (green light which is flashing, for example).

Figure 2:
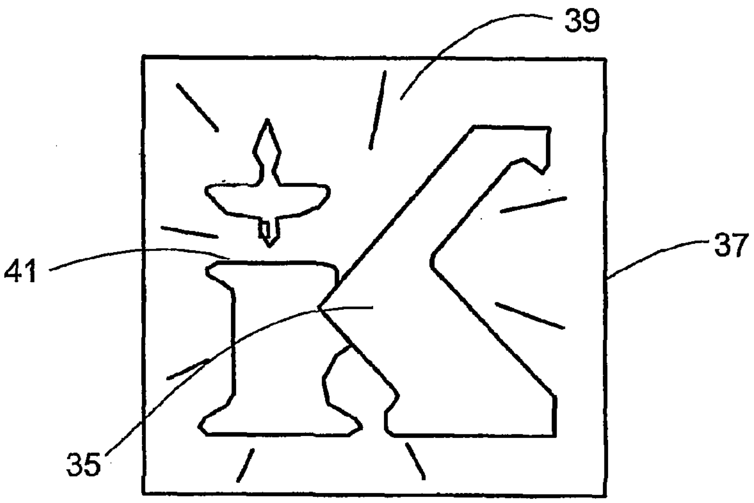
FIG. 2 is a front view of a gaming symbol on its display, for use in the gaming machine of FIG. 1.

Referring now to FIG. 2, a symbol 35 which may be displayed on a vertical reel 15, 17, 19, 21, 23 has a shape of the letter K. Symbol 35 has a primary color of orange, and is positioned on a square shaped background 37 which is colored white to provide a white background to the orange "K". In addition, other markings 39 such as strokes, are colored black, and are also placed on white background display 37. Also, symbol 35 is outlined in the color black by outline marking 41.

In this example, the entire square background 37 may be located on each of the reels. That is, each of the five reels may carry the "K" symbol 35. For example, as shown in FIG. 1, the symbol "K" is shown on reels 15, 17 and 21, appearing in rows 18 and 20, when one particular outcome of the game is finally displayed to the player. The other two reels 19, 23 may also carry the "K" symbol, which may be presented in content display 13 from time to time as the game is played. The distribution of the symbols on the reels determines the odds for obtaining predetermined combinations of those symbols, e.g. three K's on a pay line.

Processor unit 25 (FIG. 1) controls the particular display characteristic generated by complementary display area 29 and/or panel 31. The particular display characteristic generated by processor unit 25 is dependent on one or more particular symbols being displayed in content display 13 at a time during play of the game. For example, the display characteristics may be generated at the time the outcome is first displayed in game display 13, i.e., when the reels stop spinning, and continue to be generated for several seconds thereafter (e.g., three (3) seconds thereafter) or until the next outcome is displayed at the game display 13. The time duration of the generated display characteristic may be of a predetermined length of time (e.g., three (3) seconds) or may be shortened in real time as the player activates play again within three seconds of the reels stopping. As will suggest itself, the display characteristic may be generated for a fixed period of time longer than three (3) seconds or by a variable period determined according to the time that the next play is commenced by a player.

For example, when a winning combination of the "K" symbols 35 are displayed (either on an active pay line or as a scatter prize, processor unit 25 controls the complementary display 29 or panel 31 to display a complementary color of, for example, a light orange color to complement the primary color of the subject symbol 35. The complementary display 29 may include in the light orange display graphics such as a pattern of small "K"s to further highlight the winning outcome. Where the complementary display 29 is transmissive and overlays electro-mechanical reels, only portion overlying the winning symbols may be controlled to provide the display of the complementary color and graphics.

The orange color is associated in the mind of the player with the orange colored "K" symbol. The "K" symbol may be one of the important symbols of the game, as one defining an award. The player thus seeks to find an orange "K" in the game display 13. The orange color facilitates such seeking by the player, and stimulates the player through his or her eyes.

The intensity (brightness) of the orange color generated in complementary display area 29 and/or panel 31 may be increased in accordance with the number of "K" symbols appearing in the winning symbol combination. When three "K" symbols appears in winning outcome an orange color of a first intensity level is generated in complementary display area 29 and/or panel 31. When four "K" symbols appear in row 20, the orange color of a second intensity level greater than the first intensity level is generated in complementary display area 29 and/or panel 31. Likewise, greater intensity levels may be generated in complementary display area 29 and/or panel 31 five "K" symbols, respectively, appear in row 20.

Figures 3, 5:
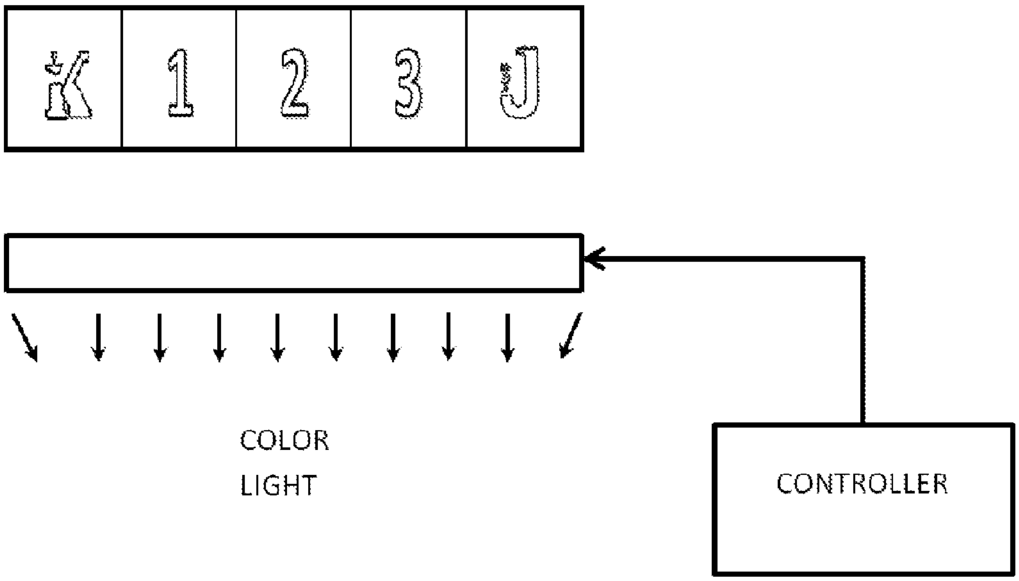
FIG. 3 is a front view of a single line game display, for use in the gaming machine of FIG. 1.
FIG. 5 is a look up table associating game symbols with light characteristics.

Referring to FIG. 3, the association of the display of at least a complementary color at complementary display 29 is shown. The game display may produce an outcome of five symbols 45, 47, 49, 51, 53 each of which has graphic characteristics such as color(s), shape etc. In one embodiment the controller 57 may control the complementary display 29 to display a color, or colors, with or without graphics to complement the display of all game symbols or selected ones of the symbols or symbols associated with a winning outcome. Where all symbols are considered the controller 57 may control the complementary display to display the dominant color for all symbols displayed or for the group of certain symbols or the color complement (opposite color) of those symbols. Accordingly each symbol may be assigned a color weighting and when the symbols are displayed the controller 57 sums the weighting and generates at the complementary display 29 a color corresponding to the average color or the dominant color, or the color corresponding to the symbol having the greater number in the display or according to any other selected protocol. In addition to the selected color displayed in the complementary display 29, graphics such as representations of game symbols or images consistent with the theme of the game may be included. Further the complementary display 29 may display more than one color associated with the display of game symbols.

Figure 4:
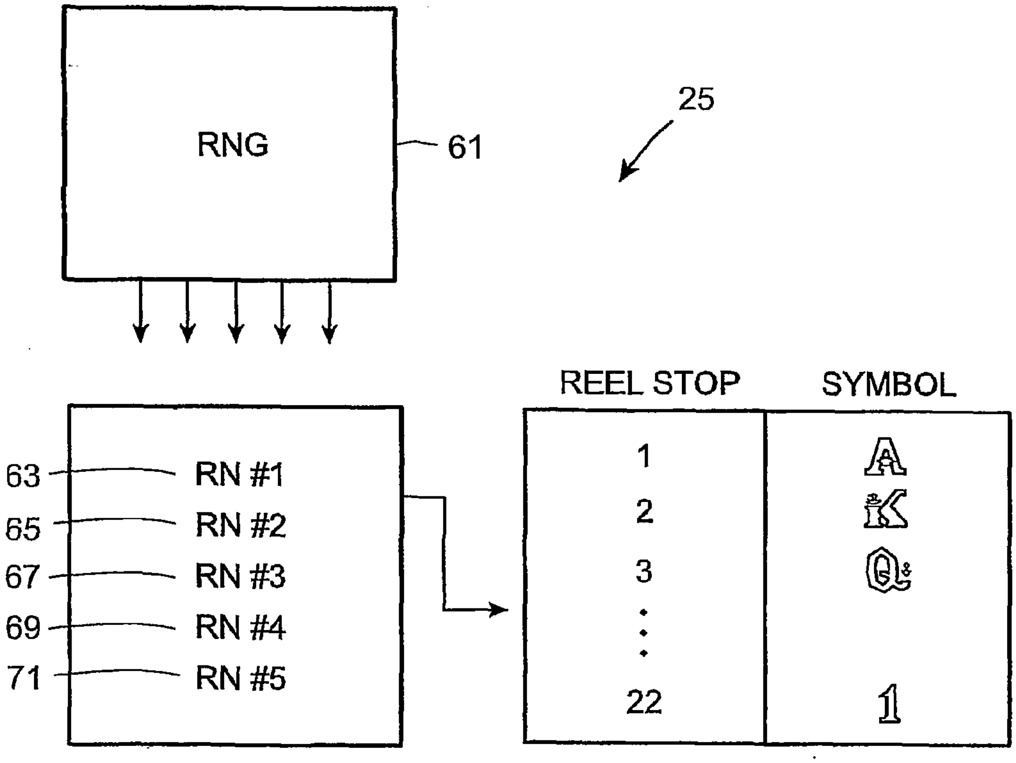
FIG. 4 is a block diagram of a random number generator and look up table.

Referring to FIG. 4, processor unit 25 may include a random number generator 61 which generates, for example, five (5) random numbers 63, 65, 67, 69, 71 upon activation of gaming device 11 to initiate play of a game and to develop the content display 13 (FIG. 1). Each random number determines the reel stop position of a respective display reel 15, 17, 19, 21, 23. For example, the first random number 63 causes a designated symbol carried by the first reel 15 to appear in row 20 of the content display. The second random number 65 causes a designated symbol carried by the second reel 17 to appear in row 20 of the content display. Likewise, the third random number 67, fourth random number 69, and the fifth random number 71 causes respective designated symbols carried by the respective third, fourth and fifth reels to appear in row 20 of the content display.

Processor unit 25 utilizes the first random number 63 to designate, i.e., identify, a particular reel stop of the first reel. A look-up table 73 identifies the particular symbol that corresponds to a particular reel stop identified by the random number. The symbol corresponding to the reel stop selected by the first random number 63 is then displayed in row 20 of the content display. For example, random number RN#3 stops the reel at reel stop 3 and a "Q" symbol is displayed on middle row 20.

In an embodiment to determine the color to be displayed is shown with reference to FIG. 5. A second look-up table 75 may be used to identify a designated color and/or a light characteristic to be associated with a symbol to be displayed in content display 13. As shown in the first row 77 of look-up table 75, the symbol "Q" is associated with a designated color "gold". The symbol "Q" is also associated with a light characteristic of gold light. Thus, the symbol Q is colored in gold and appears as a gold symbol "Q" to the player. In addition, the area 29 and/or panel 31 will generate gold light when the symbol Q is displayed in the content display.

As will suggest itself, table 75 (FIG. 5) may be incorporated directly into look-up table 73 (FIG. 4).

The term "designated color" is meant a color that is associated with a particular symbol. As discussed with respect to FIG. 2, the symbol "K" 35 is colored orange. Thus, orange is the designated color of the symbol "K". The player will associate orange with the "K" because of the "K's" visual appearance.

Referring again to FIG. 5, in the second row of table 75, the symbol "K" is associated with a designated color orange. The symbol "K" is also associated with the light characteristic of orange light.

In the third row of table 75, two "Q" symbols are associated with gold flashing light. If two "Q" symbols appear in the row 20 of the content display, the light characteristic associated with such an event is flashing gold light. Complementary display area 29 and/or panel 31 will be controlled to generate flashing gold light.

In the fourth row of table 75, two "K" symbols are associated with orange flashing light. If two "K" symbols appear in row 20 of the content display, the light characteristic generated by complementary display area 29 and/or panel 31 is flashing orange light.

As shown in FIG. 5, the fifth row of table 75 identifies the event when one "K" and one "Q" symbol both appear in row 20. In such an event, the light characteristic for such an event is a flash of gold, and then a flash of orange which may be repeated through out a time period, for example, 3 seconds.

As will suggest itself, other symbols may designate a particular color, and be associated with particular light characteristics. In addition, other combination of symbols may be associated with particular light characteristics.

When processor unit 25 generates five random numbers, the particular light characteristics will become known to the processor unit 25 by using those five random numbers and the look-up table 75. The processor will then activate a controller, such as controller 57 of FIG. 3, in order to control the display area 55 to generate the light characteristic(s) identified in table 75.

Referring again to FIG. 3, controller 57 may control light display 55 in an attenuated manner so as not to distract the player. That is, the light displayed may be subtle or soft, and thus not the primary focus of the player's attention. The player's primary attention will be on the symbols coming to rest in content display 13. In certain embodiments, the light displayed may resemble natural light, for example.

As another embodiment, the color of the light form display 65 may change based on a combination of the colors indicated by dominant symbols (symbols which play a part in a winning outcome) displayed over several outcomes.

For example, assume that no dominant symbol has occurred for at least two plays. Then an orange "K" in the following first outcome, a red "J" in the following second outcome, and a red "J" in the following third outcome may generate orange light from display 55 in the first outcome, and then adjust the light from display 55 to an orange-red light in the second outcome, and then adjust the light from display 55 still further to an orange-red-red light (one part orange, 2 parts red) in the third outcome. In such an example, the three last outcomes are used to control the light characteristics of display 55; the colors designated by the dominant symbols of the three last outcomes are combined as colors of light, and complementary display area 29 shifts from one combined color of light to the next as the gaming device is played. The color (and graphics if included) is continuous through these three plays but is varied in color between plays.

As another embodiment, the color of the complementary display area 29 or panel 31 would change only when a win outcome was presented. Such a change would occur when the reels stopped, or may occur shortly before the reels stopped, e.g., one second before the reels stopped. The light may persist until the next game is played, or end or fade off after two or three seconds.

As understood, several modifications may be made to the examples given, without departing from the spirit or scope of the invention. In addition, both displays 29 and 31 may be controlled separately to display different light characteristics, as for example, different colors of light. More than two displays may be controlled. Instead of displays adjacent to the symbol display, light characteristics could be made in the belly glass, coin tray or other locations in eye-view of the player.

The components, elements, and/or functionality of the system(s) described above may be implemented alone or in combination in various forms in hardware, firmware, and/or as a set of instructions in software, for example. Certain embodiments may be provided as a set of instructions residing on a computer-readable medium, such as a memory or hard disk, for execution on a processor-based video or electromechanical gaming machine.

Figure 6:
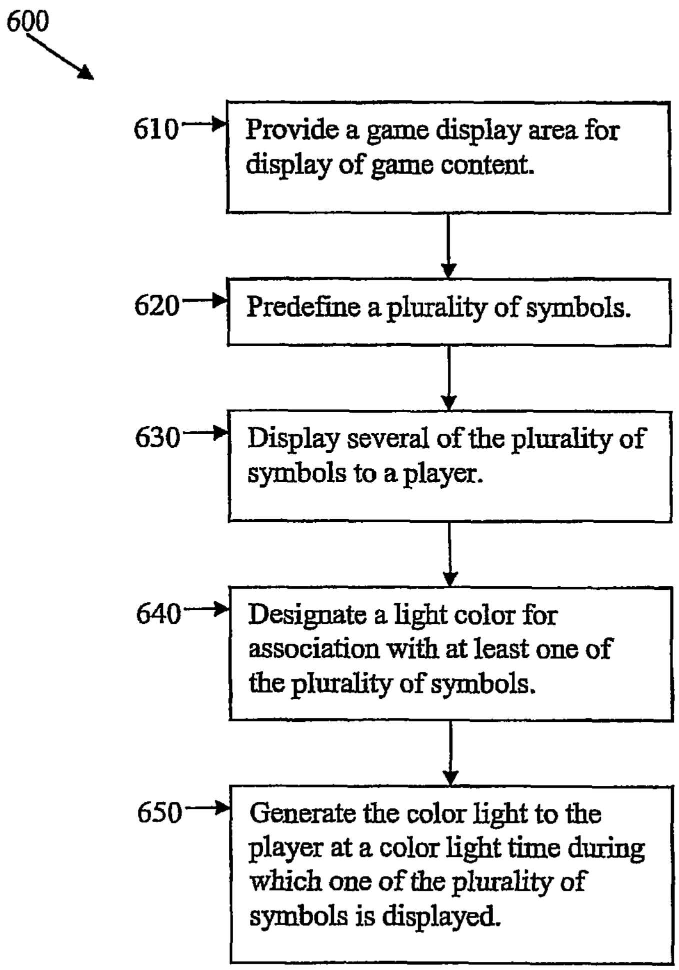
FIG. 6 illustrates a flow diagram for a method for providing a game display to a player in accordance with an embodiment of the present invention.

FIG. 6 illustrates a flow diagram for a method 600 for providing a game display to a player in accordance with an embodiment of the present invention. At step 610, a game display area is provided for display of game content.

At step 620, a plurality of symbols are predefined.

At step 630, several ones of a plurality of symbols are displayed to a player. For example, two like symbols are displayed to the player. As another example, several symbols may be displayed at a game time relative to initiation of a game by a player.

At step 640, a color is designated for association with at least one of the plurality of symbols. A complementary display area is to be provided separate from the game display area, for example.

At step 650, the color is generated to the player at a color light time during which the one of the plurality of symbols is displayed. For example, the color time commences when one of the plurality of symbols is first displayed. As another example, the color light time occurs for a predetermined length of time. Color light time may commence at a game time relative to initiation of a game by a player, for example. In certain embodiments, generated and displayed light may a light characteristic instead of and/or in addition to the light color for display. Light may be displayed in the separate light display area, for example.

One or more of the steps of the method 600 may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

The complementary display area 29 may also be controlled to display color (and graphics) in association with other game displays such as secondary game displays which may present outcomes in other than matrix-form. For example, if a player is present with a secondary game involving choices between a plurality of icons, the complementary display 20 may display features complementary to the icon selected by the player.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

Several embodiments are described above with reference to drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any machine-readable media for accomplishing its operations. As noted above, the embodiments of the present invention may be implemented using an existing processor, or by a special purpose processor incorporated for this or another purpose or by a hardwired system.

As noted above, certain embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other gaming machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Certain embodiments of the present invention may be practiced in a networked environment using logical connections to one or more gaming devices having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of gaming system configurations, including slot machines, video gaming machines, personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

Those skilled in the art will appreciate that the embodiments disclosed herein may be applied to the formation of a variety of gaming systems. Certain features of the embodiments of the claimed subject matter have been illustrated as described herein; however, many modifications, substitutions, changes and equivalents will now occur to those skilled in the art. Additionally, while several functional blocks and relations between them have been described in detail, it is contemplated by those of skill in the art that several of the operations may be performed without the use of the others, or additional functions or relationships between functions may be established and still be in accordance with the claimed subject matter. It is, therefore, to be understood that the appended claims are intended to cover all such modifications and changes as fall within the true spirit of the embodiments of the claimed subject matter.

While certain embodiments of the present invention have been described, it should be understood that these embodiments are subject to many modifications and changes without departing from the spirit and scope of the appended claims. For example, it will be understood that the invention disclosed and defined in this specification extends to all alternative combinations of two or more of the individual features mentioned or evident from the text or drawings. All of these different combinations constitute various alternative aspects of the invention. It will also be understood that the term "comprises" (or its grammatical variants) as used in this specification is equivalent to the term "includes" and should not be taken as excluding the presence of other elements or features.

What is claimed is:

1. A gaming device for use by a player, comprising:

a game display configured to display to the player at a given time a plurality of symbols, said plurality of symbols representing a game outcome comprising at least one winning combination of displayed symbols, each of said symbols having a characteristic color, the game display being defined within at least a portion of a video display device, wherein said plurality of symbols comprises at least one symbol not included in the at least one winning combination;

a complementary display area separate from the plurality of symbols of the game display and positioned in the view of the player during play such that the complementary display area borders at least a portion of the video display device, said complementary display controllable and configured to display a color; and a controller configured to:

determine the color for the complementary display area based on i) the characteristic color of each symbol in the at least one winning combination of displayed symbols that correspond to a winning outcome and ii) color weights associated with each symbol in the at least one winning combination of displayed symbols in the winning outcome; and control an intensity of the determined color being displayed at said complementary display area such that the intensity of the determined color is greater for a higher value winning outcome than for a lower value winning outcome.

2. A gaming device according to claim 1 wherein said controller is configured to control the complementary display to display graphics in addition to the determined color.

3. A gaming device according to claim 1, wherein said controller controls display of the determined color at a predefined time relative to the display of the game outcome.

4. A method of an electronic gaming machine having a game display, a complementary display, and a controller for controlling the game display and the complementary display, the method comprising:

displaying several ones of a plurality of symbols to a player at the game display under control of the controller, said displayed several ones of the plurality of symbols representing a game outcome comprising at least one winning combination of displayed symbols, each displayed symbol having visual characteristics including a characteristic color, wherein said displayed several ones of the plurality of symbols comprises at least one symbol not included in the at least one winning combination;

determining a color for the complementary display based on i) the characteristic color of each displayed symbol in the at least one winning combination of displayed symbols that correspond to a winning outcome and ii) color weights associated with each displayed symbol in the at least one winning combination of displayed symbols in the winning outcome;

displaying the determined color such that the color is visible in at least a portion of the complementary display circumscribing the game display; and controlling an intensity of the determined color being displayed by the complementary display such that the intensity is greater for a higher value winning outcome than for a lower value winning outcome.

5. The method according to claim 4 wherein said step of displaying several ones of a plurality of symbols includes displaying at least a predetermined minimum of said symbols at the game display.

6. A method of displaying a game to a player in an electronic gaming machine having a controller, the method comprising:

displaying several ones of a plurality of symbols in a game display area of the electronic gaming machine under control of the controller, wherein said displayed several ones of the plurality of symbols comprises at least one symbol not included in at least one winning combination;

determining a color based on i) a characteristic color of each displayed symbol in the at least one winning combination of displayed symbols in the game display area that correspond to a winning outcome and ii) color weights associated with each displayed symbol in the at least one winning combination of displayed symbols in the winning outcome;

displaying the determined color in a complementary display area of the electronic gaming machine that is separate from the game display area and that circumscribes at least a portion of the game display area; and controlling an intensity of the determined color being displayed at the complementary display area such that the intensity is greater for a higher value winning outcome than for a lower value winning outcome.

7. A method according to claim 6 wherein said step of the determined color occurs for a predetermined period of time, a portion of which occurs when a particular one of said symbols is displayed in said game display area.

8. A method according to claim 7 wherein said predetermined period of time is shorter than the time during which a particular one of said symbols is displayed in said game display area.

9. A method according to claim 6, wherein said complementary display area provides a flashing effect.

10. A method according to claim 6, wherein said complementary display area provides the determined color in the form of simulated natural light for a player viewing said game display area.

11. A method according to claim 6, wherein said complementary display area identifies a betting pattern of symbols in said game display area.

12. A slot machine comprising:

a game terminal;

a game display area defined within said game terminal and comprising at least one rotatable reel including a plurality of game symbols, said plurality of symbols when displayed at the game display area representing a game outcome comprising at least one winning combination of displayed symbols, wherein said plurality of symbols comprises at least one symbol not included in the at least one winning combination;

at least one complementary display area defined within said game terminal separate from the game display area and that is arranged with respect to said game display area for view by a player, said at least one complementary display area configurable to display a color to complement one or more of said displayed symbols; and a controller configured to:

determine the color for the complementary display area on i) the characteristic color of each displayed symbol in the at least one winning combination of displayed symbols that correspond to a winning outcome and ii) color weights associated with each displayed symbol in the at least one winning combination of displayed symbols in the winning outcome; and control an intensity of the determined color being displayed at said complementary display area within said game terminal such that the intensity is greater for a higher value winning outcome than for a lower value winning outcome.

13. A slot machine according to claim 12, wherein said game display area comprises at least one rotatable reel in a video display area displaying video representations of at least one rotatable reel.

14. A slot machine according to claim 12, wherein said at least one rotatable reel comprises at least one electromechanical rotatable reel.

15. A slot machine according to claim 12, further comprising an illumination panel controlled by said controller to create a flashing effect when observed by a player.

16. A slot machine according to claim 12, further comprising an illumination panel controlled by said controller to illuminate at least one but less than all symbols on said at least one rotatable reel.

17. A slot machine according to claim 12, further comprising an illumination panel controlled by said controller to illuminate an area of said game display area with colored light of a different color from normal game display area illumination in response to an event occurring during operation of the slot machine.

18. A slot machine according to claim 12, further comprising an illumination panel controlled by said controller to illuminate a betting combination on said at least one rotatable reel.

19. The gaming device of claim 1, wherein the controller is further configured to determine the color for the complementary display area by selecting the characteristic color of a displayed symbol that occurs most often in the winning outcome.

20. The gaming device of claim 1, wherein the controller is configured to determine the color for the complementary display area by:

determining, based on color weights associated with each displayed symbol in the winning outcome, an average color for the displayed symbols; and selecting the determined average color as the color for the complementary display area.

21. The gaming device of claim 1, wherein the controller is configured to determine the color for the complementary display area by:

determining, based on color weights associated with each displayed symbol in the winning outcome, a dominant color for the displayed symbols; and selecting the determined dominant color as the color for the complementary display area.

22. The gaming device of claim 1, wherein:

the displayed symbols include a plurality of symbols having different characteristic colors; and the controller is configured to determine the color for the complementary display area by selecting, based on a predefined protocol, one of the different characteristic colors as the color for the complementary display area.

* * * * *